United States Patent

Gutman et al.

[11] Patent Number: 6,041,099
[45] Date of Patent: Mar. 21, 2000

[54] SINGLE CORNER KIRKPATRICK-BAEZ BEAM CONDITIONING OPTIC ASSEMBLY

[75] Inventors: George Gutman, Birmingham; Licai Jiang; Boris Verman, both of Troy, all of Mich.

[73] Assignee: Osmic, Inc., Troy, Mich.

[21] Appl. No.: 09/026,385

[22] Filed: Feb. 19, 1998

[51] Int. Cl.[7] .................................. G21K 1/06
[52] U.S. Cl. ............................. 378/85; 378/84
[58] Field of Search .................... 378/34, 84, 85, 378/43, 145

[56] References Cited

U.S. PATENT DOCUMENTS

| | | |
|---|---|---|
| 4,174,478 | 11/1979 | Franks . |
| 5,027,377 | 6/1991 | Thoe . |
| 5,259,013 | 11/1993 | Kuriyama et al. ............... 378/43 |

FOREIGN PATENT DOCUMENTS 0 459 833 A2  5/1991  European Pat. Off. .

WO 96/04665  2/1996  WIPO .

OTHER PUBLICATIONS

XP–00210470–X–Ray Microscope with Multilayer Mirrors—James H. Underwood—Applied Optics—vol. 25, No. 11, Jun. 1, 1986.

XP–002104741–Meduim–Sized Grazing Incidence High--Energy X–Ray Telescope Employing Continuously Graded Multilayers—K. Joensen, P. Gorenstein, J. Susini, J. Wood, K. Parker—SPIE vol. 1736 X–Ray Detector Physics and Applications (1992) 239.

XP–002104742–GeoCARS Microfocusing Kirkpatrick--Baez Mirror Bender Development—B. Yang, M. Rivers, W. Schildkamp, P. Eng—1995 American Institute of Physics.

*Primary Examiner*—David P. Porta
*Attorney, Agent, or Firm*—Harness, Dickey & Pierce

[57] ABSTRACT

An x-ray reflecting system comprising a Kirkpatrick-Baez side-by-side optic in a single corner configuration having multi-layer Bragg x-ray reflective surfaces.

20 Claims, 2 Drawing Sheets

SINGLE CORNER KIRKPATRICK-BAEZ BEAM CONDITIONING OPTIC ASSEMBLY

BACKGROUND OF THE INVENTION

The present invention relates to an x-ray optic. More specifically the present invention relates to an improved Kirkpatrick-Baez optical apparatus to condition, direct, focus, or collimate an x-ray beam.

There are various applications which utilize conditioned, directed, collimated, or focused x-rays. For example, medical radiotherapy systems utilize x-rays to destroy malignant tissue, x-ray diffraction or microdiffraction analysis systems channel x-ray radiation at a sample crystal to generate a diffraction pattern corresponding to its lattice structure, and x-ray fluorescence and spectroscopy systems employ directed x-ray beams.

In many applications it is desirable to direct a beam in two dimensions. To collimate a beam in two dimensions, the traditional Kirkpatrick-Baez optical scheme may be employed. Two crossed mirrors arranged in sequential order collimate a divergent x-ray beam along two directions independently. With a point source, this sequential order system equipped with two parabolic mirrors will provide a parallel beam. With a finite source this system will provide a beam with different divergences in two directions. This sequential order system equipped with two elliptical mirrors can give a perfect real point image with a point source at its focal point. For a field object, the image will be magnified or demagnified by the system. Since the two mirrors are different distances from the object, the magnification will be different for both directions.

The present invention employs an innovative variation of the Kirkpatrick-Baez system employing a side-by-side scheme and multi-layer Bragg x-ray reflecting surfaces. The side-by-side system provides a solution to the problems associated with a sequential system as well as providing other advantages. The mirrors in a side-by-side system can be arranged at the most appropriate location for optimized optical performance to increase flux, shortening the time needed for data collection by an x-ray detection device. The side-by-side system will suffer less from surface imperfections and is prealigned and bonded to prevent alignment errors. The side-by-side optic is also much more compact than that of a sequential scheme enabling it to be used in applications where space is at a premium. The performance of a side by side optic can be even further improved by incorporating graded-d multi-layer Bragg x-ray reflectors. The multi-layer reflectors have a large reflection angle resulting in higher collection efficiency and provide the ability to select the frequencies of reflected x-rays.

SUMMARY OF THE INVENTION

The present invention is a new type of x-ray optic based upon the Kirkpatrick Baez side-by-side scheme and multi-layer Bragg x-ray reflective surfaces. The present invention incorporates graded-d multi-layer Bragg reflectors that are prealigned and bonded together in the side by side Kirkpatrick-Baez scheme. The reflectors will provide a large flux density when focused on a small sample and the multi-layer structure will allow the x-ray optic to control the frequency band reflected. The x-ray optic will have the ability to reflect x-rays in a broad band, narrow band, monochromatic, or frequency selectable polychromatic manner.

An object of the present invention is to increase the flux on a sample.

Another object of the invention is to decrease the aberration of an x-ray optic.

Another object of the invention is to create a compact x-ray optic that is easily maneuvered.

A further object of the invention is to provide an x-ray optic that is easily aligned.

An even further object of the invention is to provide a narrow band, monochromatic, or frequency selectable polychromatic x-ray beam.

DETAILED DESCRIPTION OF THE PREFERRED EMBODIMENT

Figure 1:
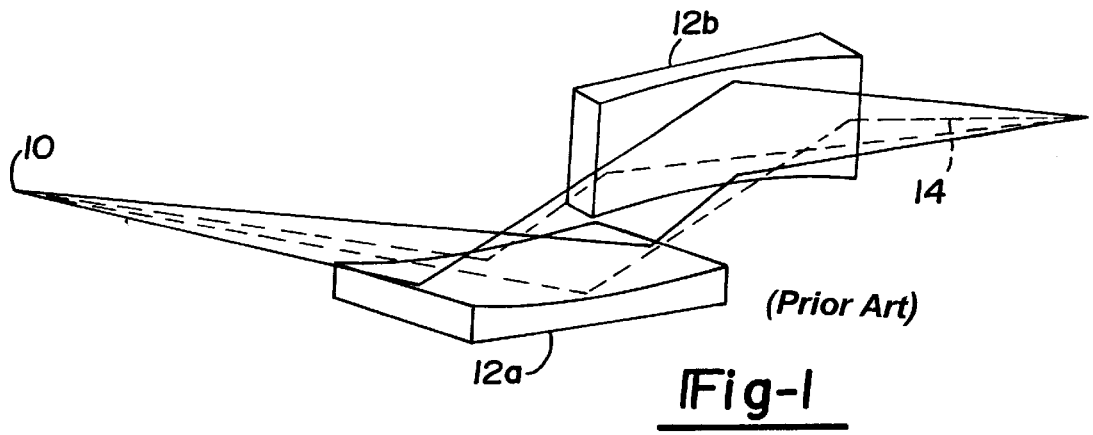
FIG. 1 is a diagrammatic view of a traditional sequentially ordered Kirkpatrick-Baez mirror system.

FIG. 1 is a diagrammatic view of a traditional sequentially ordered Kirkpatrick-Baez mirror system. This sequentially ordered mirror system may focus or collimate an x-ray beam in two dimensions by reflecting a divergent x-ray beam along two directions independently. The mirrors 12a and 12b are arranged in consecutive order and may be configured with a parabolic or elliptical surface. With a point source 10, this sequential order system equipped with two parabolic mirrors will provide a parallel beam. With a finite source, this parabolic mirror system will provide a beam with different divergences in two directions. When elliptical mirrors are substituted for parabolic mirrors the sequentially ordered system will provide a focused beam and give a perfect real point image with a point source at its focal point. For a field object, the image will be magnified or demagnified by the system. The magnification will vary with the distances separating the mirrors and the object.

There are several limitations which greatly affect the performance of the sequential order Kirkpatrick-Baez system. There is no way to install both mirrors at the most optimized positions, which results in less flux and a larger aberration. Consider a figure deviation from the ideal curvature $\Delta\alpha$ of the reflective surface, the deviation of the ray from the theoretical position at the image plan will be equal to $2\Delta|$, where $|$ is the distance between incident point and image plane. For a sequential system, the figure error on the mirror nearer to the object results in a larger deviation. When the mirrors are located at different distances from the detector, if both mirrors have the same angular deviation, the aberration from the mirror closest to the source will be larger. A sequential order Kirkpatrick-Baez system will have varied amplification because the mirrors are placed at different positions with relation to field object distance. Lastly, the alignment hardware for a sequential order Kirkpatrick-Baez mirror is bulky and complicated and the alignment procedures are difficult and time consuming since the adjustments include alignments relative to the beam and the alignments relative to both mirrors.

Figure 2:
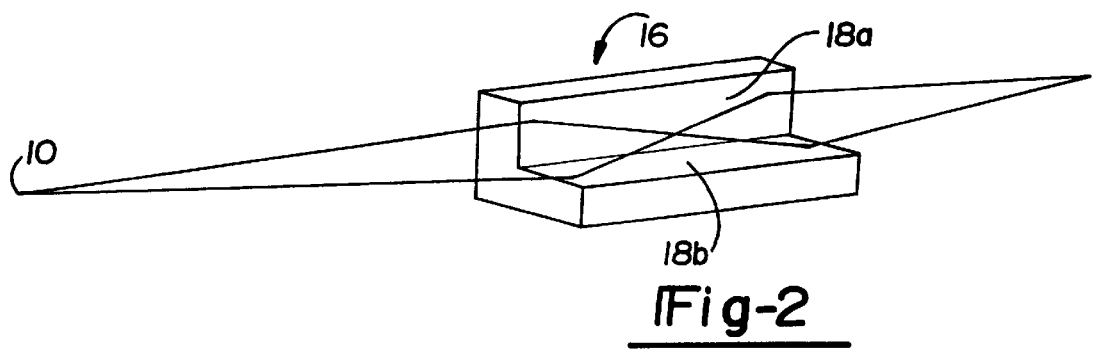
FIG. 2 is a diagrammatic view of a side-by-side Kirkpatrick-Baez mirror system.

A side-by-side Kirkpatrick-Baez system provides a solution to the problems associated with a sequential system as well as providing other advantages. In FIG. 2 a side-by-side system is shown generally as 16. The reflecting surfaces 18*a* and 18*b* are mounted adjacent at a 90 degree angle. The side-by-side system has no distance offset between reflecting surfaces as does the sequential order system, reducing potential aberration problems.

Figure 3A:
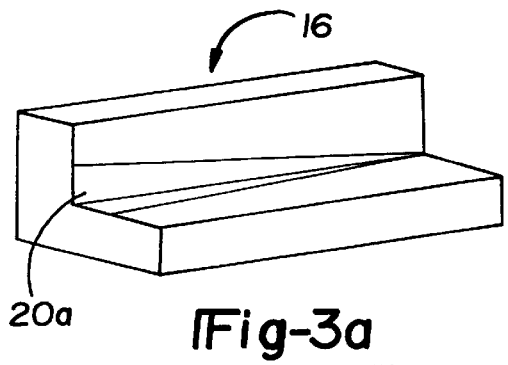
FIGS. 3a–3b are diagrammatic views of a side-by-side Kirkpatrick-Baez mirror system illustrating the system's working areas.
Figure 3B:
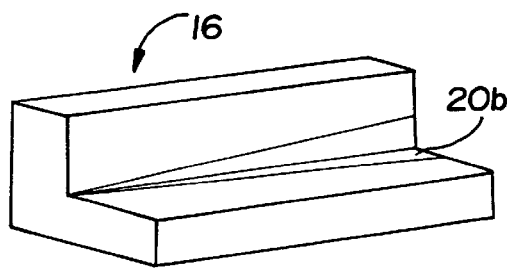

FIGS. 3*a*–3*b* are diagrammatic views of a side-by-side Kirkpatrick-Baez mirror system illustrating a first working zone 20*a* and second working zone 20*b* upon the mirror surfaces. The working zones 20*a* and 20*b* are located upon and adjacent to the corner formed by the coupling of the reflective surfaces 18*a* and 18*b*.

Figure 4:
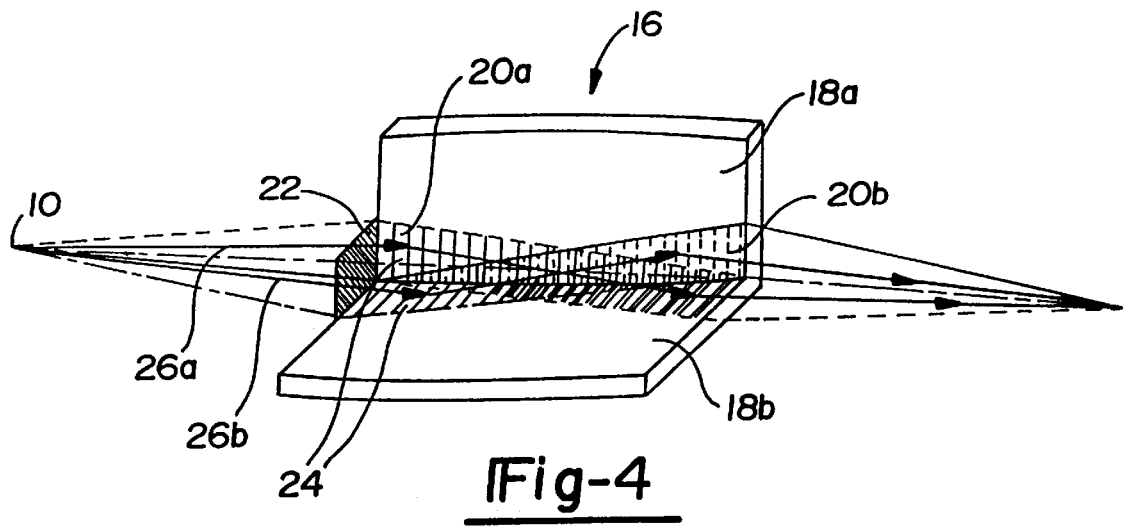
FIG. 4 is a more detailed diagrammatic view of a side-by-side Kirkpatrick-Baez system illustrating x-ray beam paths.

FIG. 4 is a more detailed diagrammatic view of a side-by-side Kirkpatrick-Baez system illustrating incident and reflected x-ray beam paths. Individual x-ray beams 26*a* and 26*b* are radiated from x-ray source 10 and may first be examined at the cross section 22 of the x-ray beam. The cross section 22 of the beam illustrates the many divergent directions of the x-ray beams exiting the x-ray source 10. Individual x-ray beam 26*a* is incident upon working zone 20*a* which lies generally upon the junction of reflective surfaces 18*a* and 18*b*. Individual x-ray beam 26*b* is also incident upon working zone 20*a*. The beams 26*a* and 26*b* are reflected by working zone 20*a* and redirected to working zone 20*b* which also lies generally upon the junction of reflective surfaces 18*a* and 18*b* opposite and partially overlapping working zone 20*a* as shown in FIG. 3*a* and 3*b*. The beams 26*a* and 26*b* then exit the system 16 and may be in divergent, collimated or focused form depending upon the shapes of the reflective surfaces 18*a* and 18*b* and the form of the x-ray source. This configuration is generally known as an single corner configuration.

Any combination of parabolic or elliptical mirror surfaces for the present invention may be used. For example, one reflecting surface may have an elliptical surface and a second reflecting surface may have a parabolic reflecting surface.

The reflective surfaces in the present invention are configured as multi-layer or graded-d multi-layer Bragg x-ray reflective surfaces. Bragg structures only reflect x-ray radiation when Bragg's equation is satisfied:

$$n\lambda = 2d \sin(\theta)$$

where
n=the order of reflection
$\lambda$=wavelength of the incident radiation
d=layer-set spacing of a Bragg structure or the lattice spacing of a crystal
$\theta$=angle of incidence Multi-layer or graded-d multi-layered Bragg mirrors are optics with a fixed focal point which utilize their inherent Bragg structure to reflect narrow band or monochromatic x-ray radiation. The bandwidth of the reflected x-ray radiation can be customized by manipulating the optical and multi-layer parameters. The d-spacing of the multi-layer mirror can be tailored in such a way that the Bragg condition is satisfied at every point on the multi-layer mirror. The d spacing may be changed laterally or depthwise to control the bandpass of the multi-layer mirror.

The multi-layer mirror has a large reflection angle resulting in higher collection efficiencies for incident x-rays. These multi-layered mirrors could increase the flux by more than an order with a fine focus x-ray tube, as compared with total reflection mirrors. Multi-layered mirrors, because of their monochromatic output, could also reduce the unwanted characteristic radiation during diffraction analysis by thousands of times.

Figure 5:
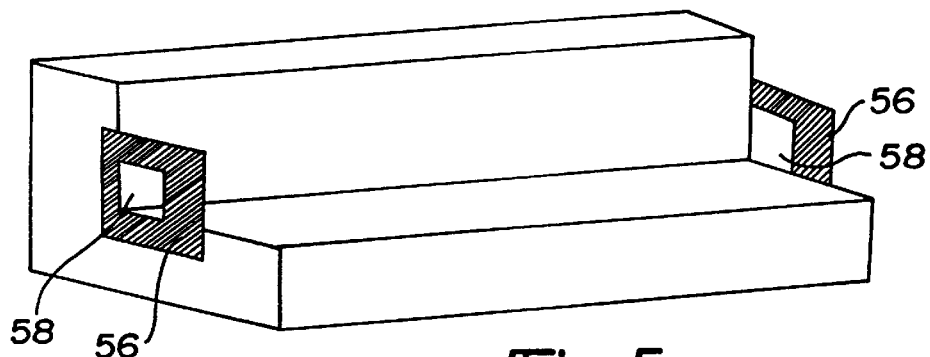
FIG. 5 is a perspective view of a side-by-side Kirkpatrick-Baez mirror system with aperture assemblies.

Therefor as seen in FIG. 5 when employing the single corner optic an x-ray aperture assembly 56, an aperture 58 may be placed at the entrance area, exit area or both to eliminate coaxial direct x-rays, single bounce x-rays, or scattered x-rays.

The combination of side-by-side Kirkpatrick-Baez scheme and multi-layer or graded-d multi-layer Bragg x-ray reflective surfaces can provide superior optics for many applications requiring directed, focused, or collimated x-rays.

Figure 6:
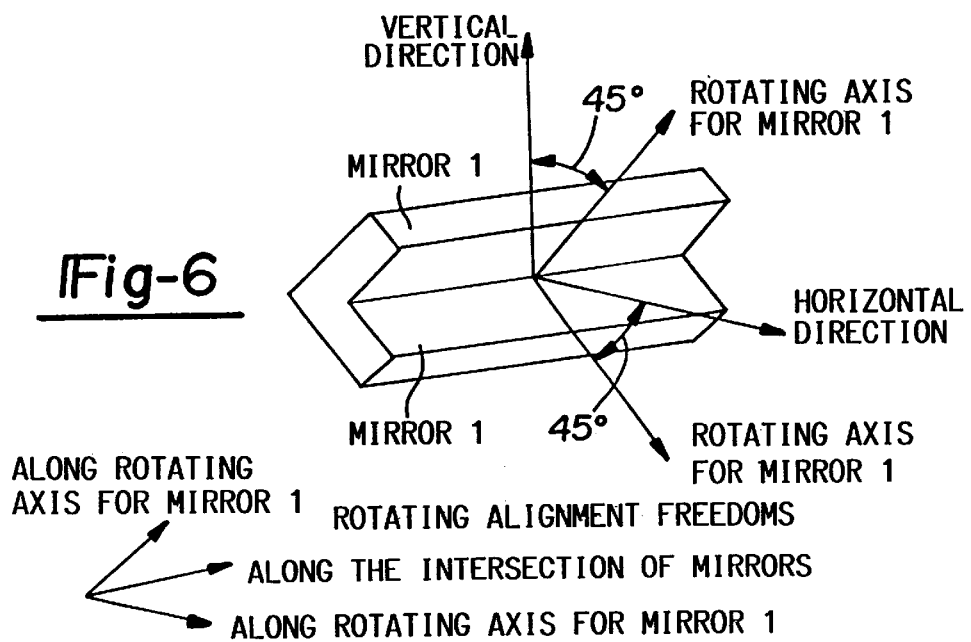
FIG. 6 is a diagrammatic view of a method of aligning the present invention.

FIG. 6 is a diagrammatic drawing showing the alignment method of the present invention. A Kirkpatrick-Baez mirror to work correctly must have a very specific orientation. The present invention utilizes microadjustment hardware to correctly orient a Kirkpatrick-Baez mirror. The alignment of the optic can be achieved with five freedoms of adjustments: two rotations and three translations. The rotating axes for two mirrors should go through the centers of the intersection of the two mirrors, and parallel to the mirrors respectively, as shown in the schematic picture. The two translations, which are perpendicular to the optic, should be parallel to the mirror surfaces respectively, (see the bottom of FIG. 6). These freedoms allow the adjustments of the incident angles and beam positions.

It is to be understood that the invention is not limited to the exact construction illustrated and described above, but that various changes and modifications may be made without departing from the spirit and scope of the invention as defined in the following claims.

We claim:

1. An x-ray directing system comprising:
    a Kirkpatrick-Baez side-by-side optic which redirects x-rays, wherein said Kirkpatrick-Baez side-by-side optic has multi-layer Bragg x-ray reflective surfaces.

2. The x-ray directing system of claim 1, wherein said multi-layer Bragg x-ray reflective surfaces have graded-d spacing.

3. The x-ray directing system of claim 2 wherein said graded-d spacing is lateral grading.

4. The x-ray directing system of claim 2 wherein said graded-d spacing is depth grading.

5. The x-ray directing system of claim 1, wherein said multi-layer Bragg x-ray reflective surfaces have an elliptical surface.

6. The x-ray directing system of claim 1, wherein said multi-layer Bragg x-ray reflective surfaces have a parabolic surface.

7. The x-ray directing system of claim 1, wherein said multi-layer Bragg x-ray reflective surfaces are a parabolic surface and an elliptical surface.

8. The x-ray directing system of claim 1 further including at least one x-ray aperture assembly, wherein said assembly occludes a portion of said x-rays.

9. An x-ray reflecting system comprising:
    a unitary x-ray reflector having at least two reflective surfaces pre-aligned and bonded together;
    wherein said x-ray reflector is a multi-layer Bragg x-ray reflector; and
    wherein said x-ray reflector reflects an incident beam in two directions independently.

10. The x-ray reflecting system of claim 9, wherein said multi-layer Bragg x-ray reflector has graded-d spacing.

11. The x-ray reflecting system of claim 10, wherein said graded-d spacing is lateral graded.

12. The x-ray reflecting system of claim 10, wherein said graded-d spacing is depth graded.

13. The x-ray reflecting system of claim 9, wherein said multi-layer Bragg x-ray reflector has an elliptical surface.

14. The x-ray reflecting system of claim 9, wherein said multi-layer Bragg x-ray reflector has a parabolic surface.

15. The x-ray reflecting system of claim 9, wherein said multi-layer Bragg x-ray reflector has a parabolic surface and an elliptical surface.

16. The x-ray reflecting system of claim 9 further including at least one x-ray aperture assembly, wherein said assembly occludes a portion of said x-rays.

17. An x-ray directing system comprising:

a Kirkpatrick-Baez side-by-side optic which redirects x-rays, wherein said Kirkpatrick-Baez side-by-side optic has multi-layer Bragg x-ray reflective surfaces, and wherein said Kirkpatrick-Baez side-by-side optic is radiationally coupled to a microfocused x-ray source.

18. The x-ray directing system of claim 17, wherein said multi-layer Bragg x-ray reflective surfaces have graded-d spacing.

19. The x-ray directing system of claim 17, wherein said multi-layer Bragg x-ray reflective surfaces have an elliptical surface.

20. The x-ray directing system of claim 17, wherein said multi-layer Bragg x-ray reflective surfaces have a parabolic surface.

* * * * *